United States Patent
Tseng (10) Patent No.: US 11,294,091 B1
(45) Date of Patent: Apr. 5, 2022

(54) DETECTING MACHINE FOR DETECTING A METAL FOREIGN OBJECT

(71) Applicant: Yu Sheng Technology Co., Ltd., Taichung (TW)

(72) Inventor: Hsin-Ming Tseng, Taichung (TW)

(73) Assignee: Yu Sheng Technology Co., Ltd., Taichung (TW)

( * ) Notice: Subject to any disclaimer, the term of this patent is extended or adjusted under 35 U.S.C. 154(b) by 0 days.

(21) Appl. No.: 17/060,654

(22) Filed: Oct. 1, 2020

(51) Int. Cl.
| | | |
|---|---|---|
| *G01V 3/08* | (2006.01) |
| *G01V 3/36* | (2006.01) |
| *G06K 19/07* | (2006.01) |
| *G06K 7/10* | (2006.01) |
| *G08B 21/18* | (2006.01) |

(52) U.S. Cl.
CPC ............ *G01V 3/081* (2013.01); *G01V 3/36* (2013.01); *G06K 7/10366* (2013.01); *G06K 19/0723* (2013.01); *G08B 21/18* (2013.01)

(58) Field of Classification Search
CPC ...... G01V 3/081; G01V 3/36; G06K 7/10366; G06K 19/0723; G08B 21/18
USPC ........................................... 324/244
See application file for complete search history.

(56) References Cited

U.S. PATENT DOCUMENTS

| | | | | |
|---|---|---|---|---|
| 7,117,902 B2* | 10/2006 | Osborne | ................ | B65B 3/003 141/27 |
| 7,240,699 B2* | 7/2007 | Osborne | ................ | B65B 3/003 141/104 |
| 7,316,351 B2* | 1/2008 | Carlson | ................ | G07F 7/0609 235/380 |
| 7,810,634 B2* | 10/2010 | Wallace | ................ | B65G 43/02 198/810.02 |
| 10,894,664 B1* | 1/2021 | Brady | ................ | B65G 1/0492 |
| 11,126,173 B2* | 9/2021 | Celia | ................ | G05B 23/0291 |
| 2005/0045242 A1* | 3/2005 | Osborne | ................ | B65B 7/2821 141/27 |
| 2006/0201575 A1* | 9/2006 | Osborne | ................ | B65B 7/2821 141/27 |

(Continued)

FOREIGN PATENT DOCUMENTS

| | | | | |
|---|---|---|---|---|
| AU | 2017387164 A1 * | 7/2019 | ............... | B60Q 9/00 |
| CN | 101625784 B * | 6/2011 | | |

(Continued)

OTHER PUBLICATIONS

CEIA. THS/MBB—Modular Conveyor Belt Configuration, www.ceia.net. Sep. 2020. (Year: 2020).*

(Continued)

*Primary Examiner* — Patrick Assouad
*Assistant Examiner* — Sean Curtis
(74) *Attorney, Agent, or Firm* — Burris Law, PLLC (57) ABSTRACT

A detecting machine for detecting a metal foreign object in a to-be-detected object that includes a tag is provided. The detecting machine includes: abase unit that includes an overhead arch; a detecting unit that generates a magnetic signal in response to the to-be-detected object moving past the overhead arch; a tag reader that detects the tag on the to-be-detected object and that generates a tag signal; a display unit that includes a first display and a second display; and a processor that is configured to control the display unit to display information regarding the magnetic signal and the tag signal on the first and second displays.

11 Claims, 8 Drawing Sheets

(56) References Cited

U.S. PATENT DOCUMENTS

2010/0025198 A1* 2/2010 Wallace ................ B65G 43/02
                                                   198/810.02
2019/0338497 A1* 11/2019 Espejo Pina .......... E02F 9/2808

FOREIGN PATENT DOCUMENTS

| CN | 109939964 | A  | * | 6/2019  |            |            |
|----|-----------|----|---|---------|------------|------------|
| CN | 111703770 | A  | * | 9/2020  |            |            |
| DE | 102018121762 | A1 | * | 9/2019  | ............. | G01V 3/107 |
| EP | 3816673   | A1 | * | 5/2021  | ............... | G01V 3/38  |
| JP | H11292270 | A  | * | 10/1999 |            |            |
| JP | 4067620   | B2 | * | 3/2008  |            |            |
| JP | 2021039787 | A  | * | 3/2021  |            |            |
| KR | 20070028167 | A  | * | 3/2007  |            |            |
| KR | 100805861 | B1 | * | 2/2008  |            |            |
| KR | 20200019362 | A  | * | 2/2020  |            |            |
| KR | 102116120 | B1 | * | 6/2020  |            |            |
| WO | WO-2004094276 | A1 | * | 11/2004 | ............. | B65G 43/02 |
| WO | WO-2005017814 | A1 | * | 2/2005  | ............... | G06K 9/00  |
| WO | WO-2021156228 | A1 | * | 8/2021  | ........... | G07G 1/0063 |

OTHER PUBLICATIONS

See KR-102116120-B1 English Translation. Feb. 2020. (Year: 2020).*

* cited by examiner

DETECTING MACHINE FOR DETECTING A METAL FOREIGN OBJECT

FIELD

The disclosure relates to a detecting machine, and more particularly to a detecting machine for detecting a metal foreign object.

BACKGROUND

A conventional metal detector may be employed for determining whether an object contains metal material and/or magnetic material. The metal detectors have been applied to various fields. In one application, the metal detectors may be used in shoemaking processes to detect undesired metal material and/or magnetic material in a shoebox containing a pair of newly made shoes. The undesired metal material and/or magnetic material is a foreign object that should not be in the shoebox and may be, for example, needles, blades, staples, copper buttons, aluminum sheets used during manufacture of the shoes.

SUMMARY

One object of the disclosure is to provide a detecting machine that can be operated at reduced cost and manpower.

According to one embodiment of the disclosure, the detecting machine is for detecting a metal foreign object in a to-be-detected (TBD) object that includes a tag. The detecting machine includes abase unit, a detecting unit, a tag reader, a display unit, and a processor.

The base unit includes a transporting module and an overhead arch disposed over the transporting module. The transporting module is configured to move the TBD object past the overhead arch.

The detecting unit is disposed on the base unit and includes a magnetic sensor capable of generating a magnetic signal in response to the TBD object moving past the overhead arch.

The tag reader is disposed on the base unit beside the overhead arch, and is capable of detecting the tag on the TBD object in response to the TBD object moving past the overhead arch, and generating a tag signal based on a result of the detecting action.

The display unit is disposed on the base unit and includes a first display and a second display.

The processor is connected to the detecting unit and the tag reader. The processor is configured to receive the magnetic signal and the tag signal therefrom, respectively, and is connected to the display unit and configured to control the display unit to display information regarding the magnetic signal and the tag signal on the first and second displays.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 3 and 5, a detecting machine for detecting a metal foreign object according to one embodiment of the disclosure is provided.

In this embodiment, the detecting machine includes a base unit 1, a detecting unit 2, a tag reader 3, a display unit 4 and a processor unit 5.

Figure 1:
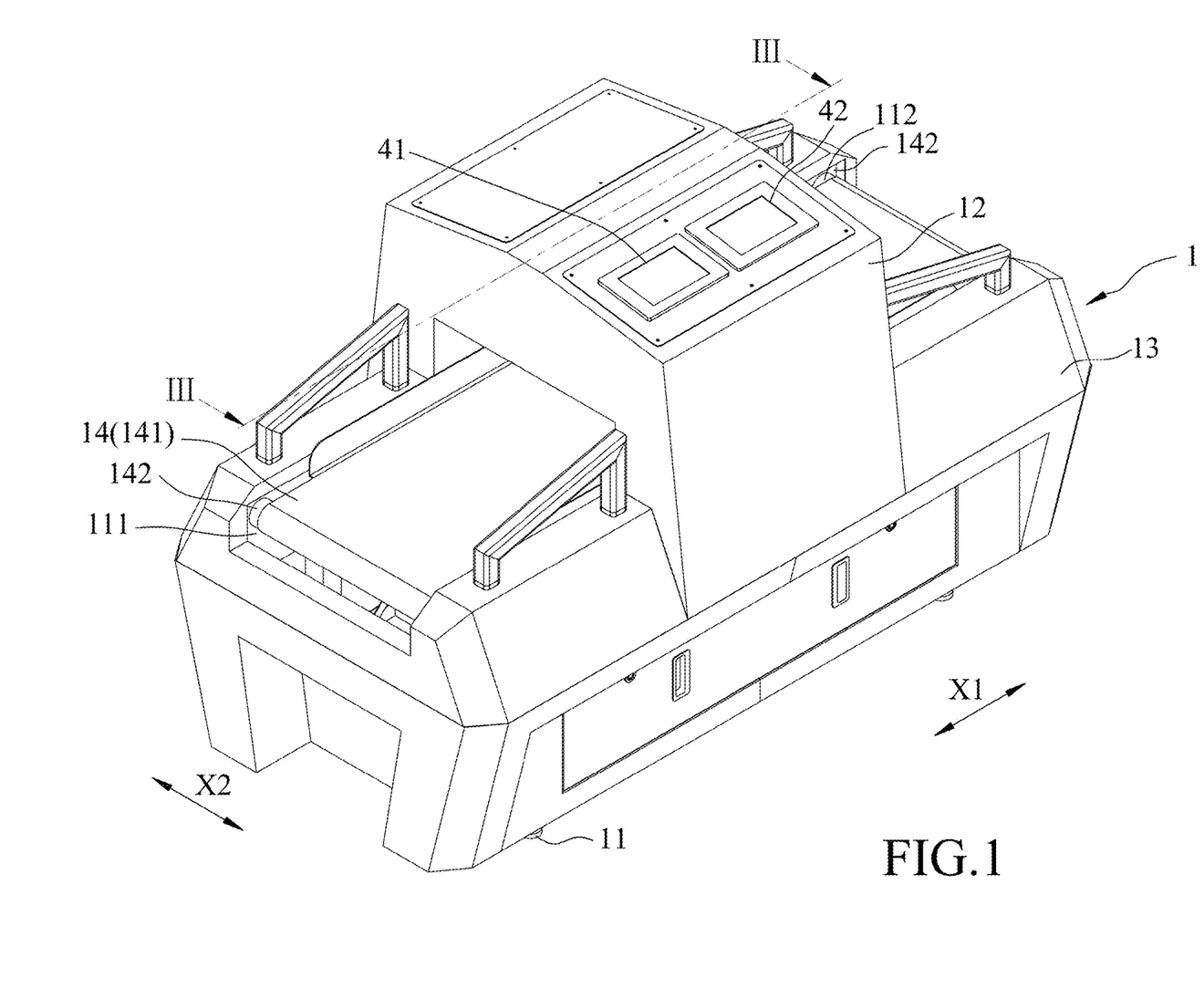
FIG. 1 is a schematic perspective view of a detecting machine for detecting a metal foreign object according to one embodiment of the disclosure.
Figure 2:
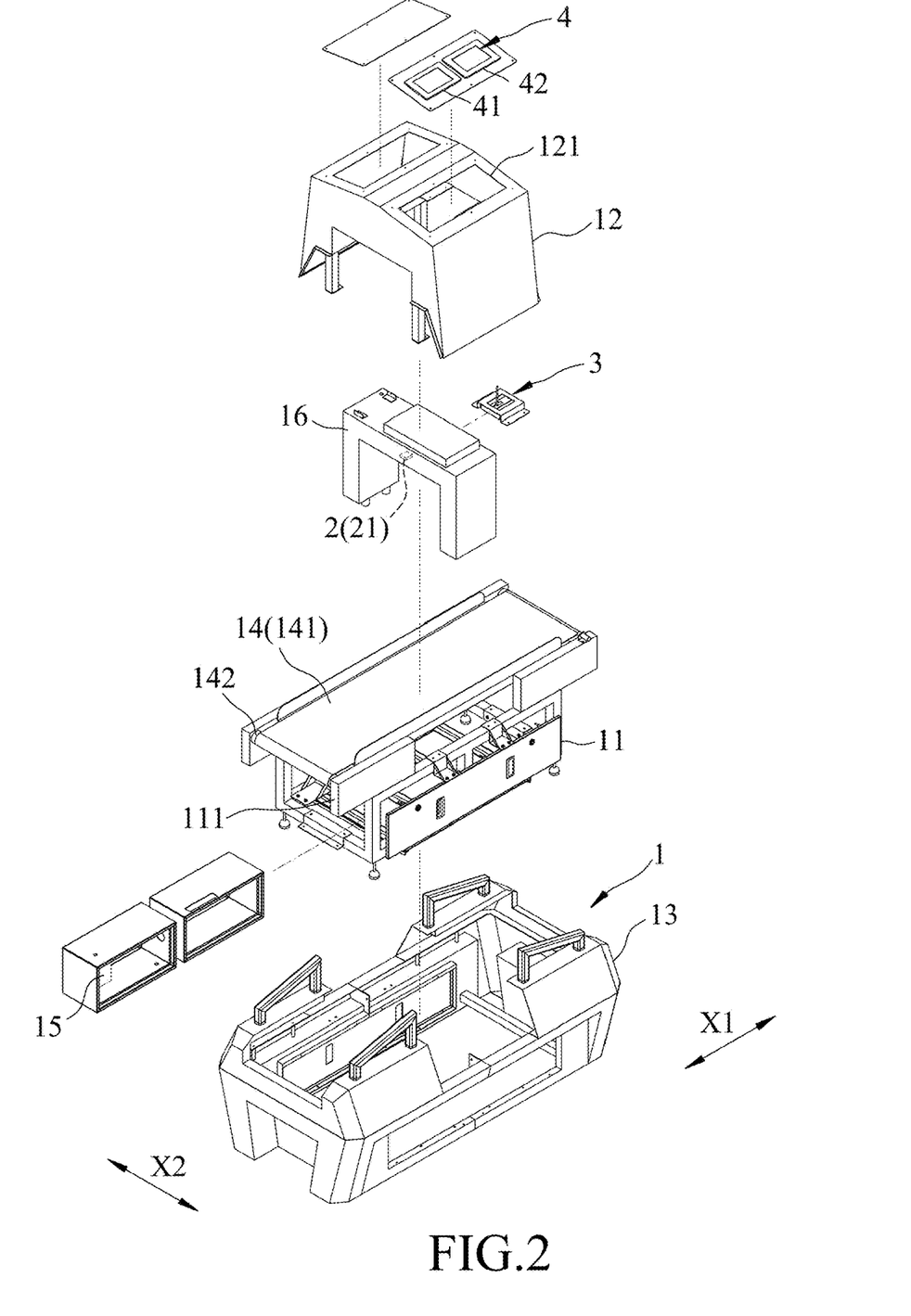
FIG. 2 is an exploded perspective view of the detecting machine.
Figure 3:
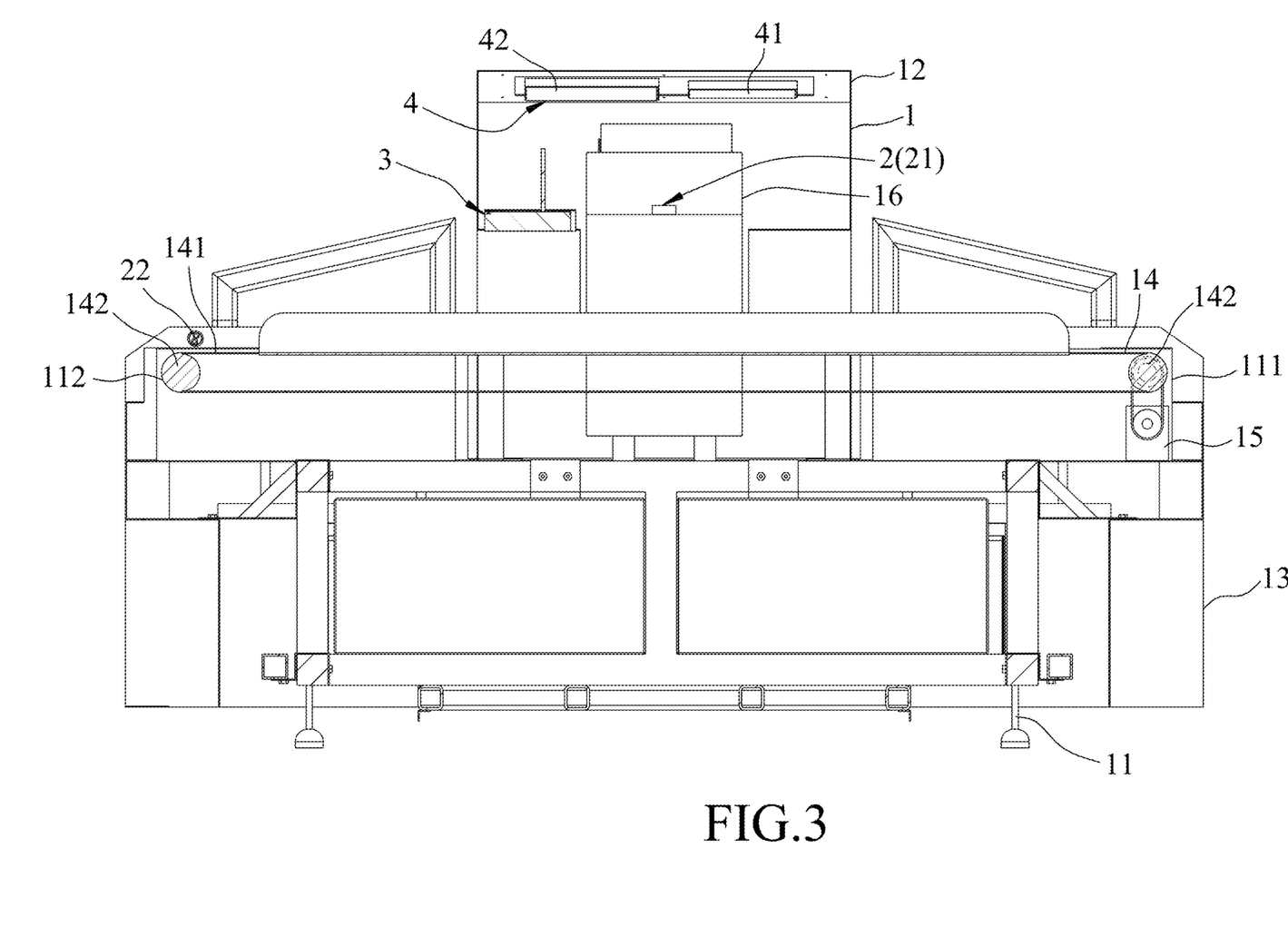
FIG. 3 is a sectional view of the detecting machine taken along line III-III in FIG. 2.

The base unit 1 includes abase 11, a covering shell 12, a bottom shell 13, a transporting module 14, an actuator 15, and an overhead arch 16.

The base 11 extends in a first direction (X1) (i.e., a longitudinal direction of the detecting machine), and has an initial end 111 and a destination end 112 opposite to the initial end 111. The transporting module 14 includes a conveyor belt 141 and two rolling members 142. The conveyor belt 141 is disposed on the base 11 and is configured to be moved by the rolling members 142 to move a to-be-detected (TBD) object 6 (see FIG. 4) thereon toward one of the initial end 111 and the destination end 112.

The actuator 15 is disposed in the base 11 and is configured to actuate the rolling members 142 of the transporting module 14 to rotate. For example, the rolling members 142 are respectively a head pulley (driving pulley) and a tail pulley, and the actuator 15 is a motor configured to drive the head pulley of the rolling members 142 to rotate for moving the conveyor belt 141.

The overhead arch 16 is disposed over the conveyor belt 141 of the transporting module 14, and extends along a second direction (X2) that is perpendicular to the first direction (X1).

The covering shell 12 is disposed above the overhead arch 16 for covering the same, and is formed with an opening 121.

Figure 5:
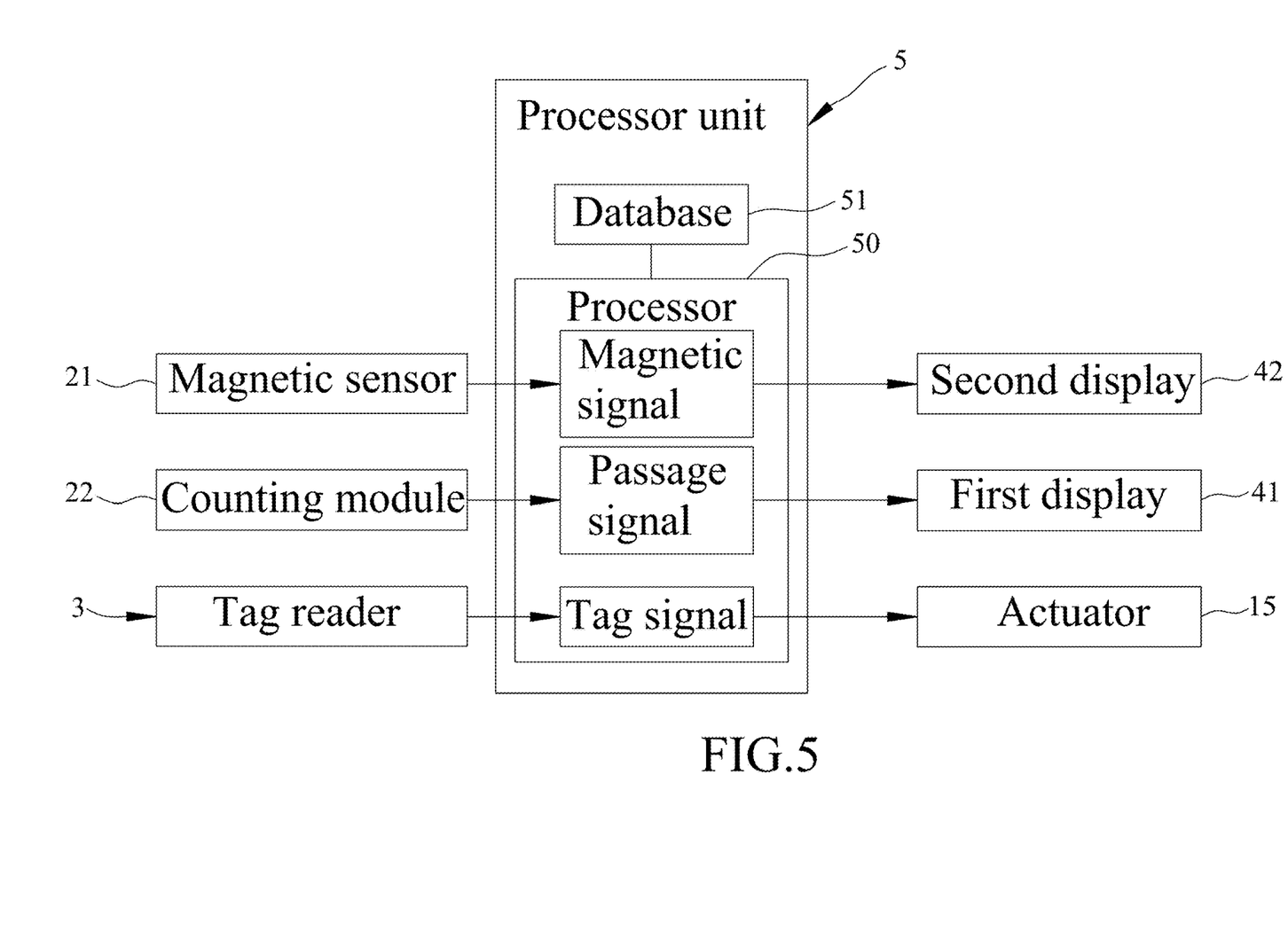
FIG. 5 is a block diagram illustrating connections among components of the detecting machine.

The detecting unit 2 is disposed on the base unit 1 and includes at least one magnetic sensor 21, and a counting module 22.

The magnetic sensor 21 may be embodied in the form of a magnetometer that is capable of generating a magnetic signal in response to the TBD object 6 moving past the overhead arch 16. In the case that the TBD object 6 contains a metal foreign object made of electrically conductive metal, the magnetic sensor 21 is able to detect the resulting change in magnetic field and generate the magnetic signal reflecting the change in magnetic field, indicating that the TBD object 6 contains electrically conductive metal. In this embodiment, the electrically conductive metal is also magnetic metal. In other embodiments, other kinds of magnetic sensors 21 that are commercially available may be employed. In some embodiments, a plurality of magnetic sensors 21 may be present for providing a larger range of detection.

The counting module 22 is disposed in proximity of the destination end 112, and may be embodied using an infrared-based digital object counter that is commercially available. In use, when the TBD object 6 is moved past the counting module 22, the counting module is configured to generate a passage signal in response.

Figure 4:
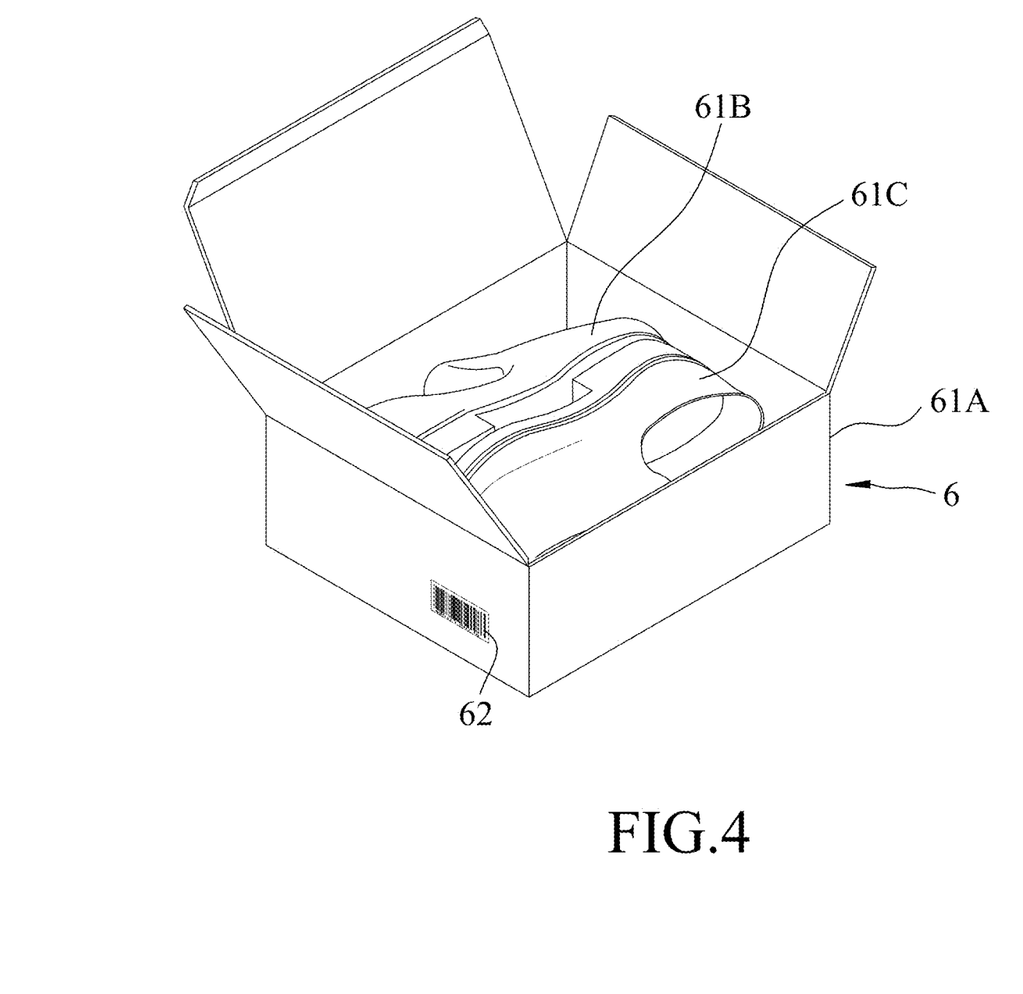
FIG. 4 is schematic view of an exemplary to-be-detected object.

The tag reader 3 is disposed on the covering shell 12 of the base unit 1 beside the overhead arch 16 and is capable of detecting a tag on the TBD object 6 in response to the TBD object 6 moving past the overhead arch 16, and generating a tag signal upon detecting the tag. In the example of FIG. 4, the TBD object 6 includes a plurality of TBD parts and the tag 62. In this example, three TBD parts 61A, 61B and 61C are present, representing the shoebox, a left shoe of the pair of shoes, and a right shoe of the pair of shoes, respectively.

The tag 62 may be embodied using an active radio frequency identification (RFID) tag, and the tag reader 3 may be embodied using an active RFID reader (ARAT) system. In other embodiments, the tag 62 may be embodied using a passive RFID tag, and the tag reader 3 may be embodied using a passive reader active tag (PRAT) system. It is noted that the techniques regarding the reading of RFID tags is readily available in the known art, so details thereof are omitted herein for the sake of brevity.

Figure 6:
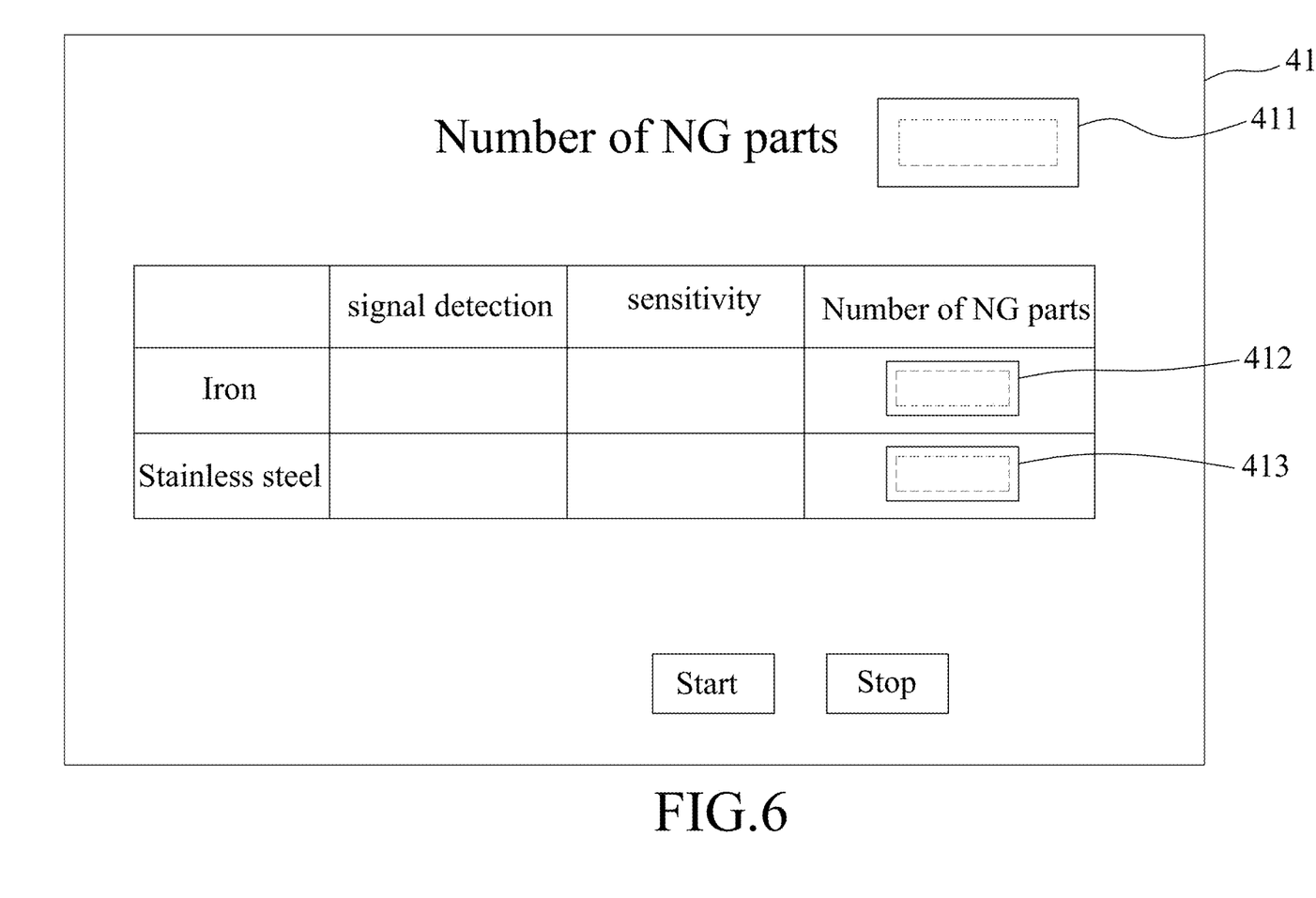
FIG. 6 illustrates a first display of a display unit of the detecting machine.
Figure 7:
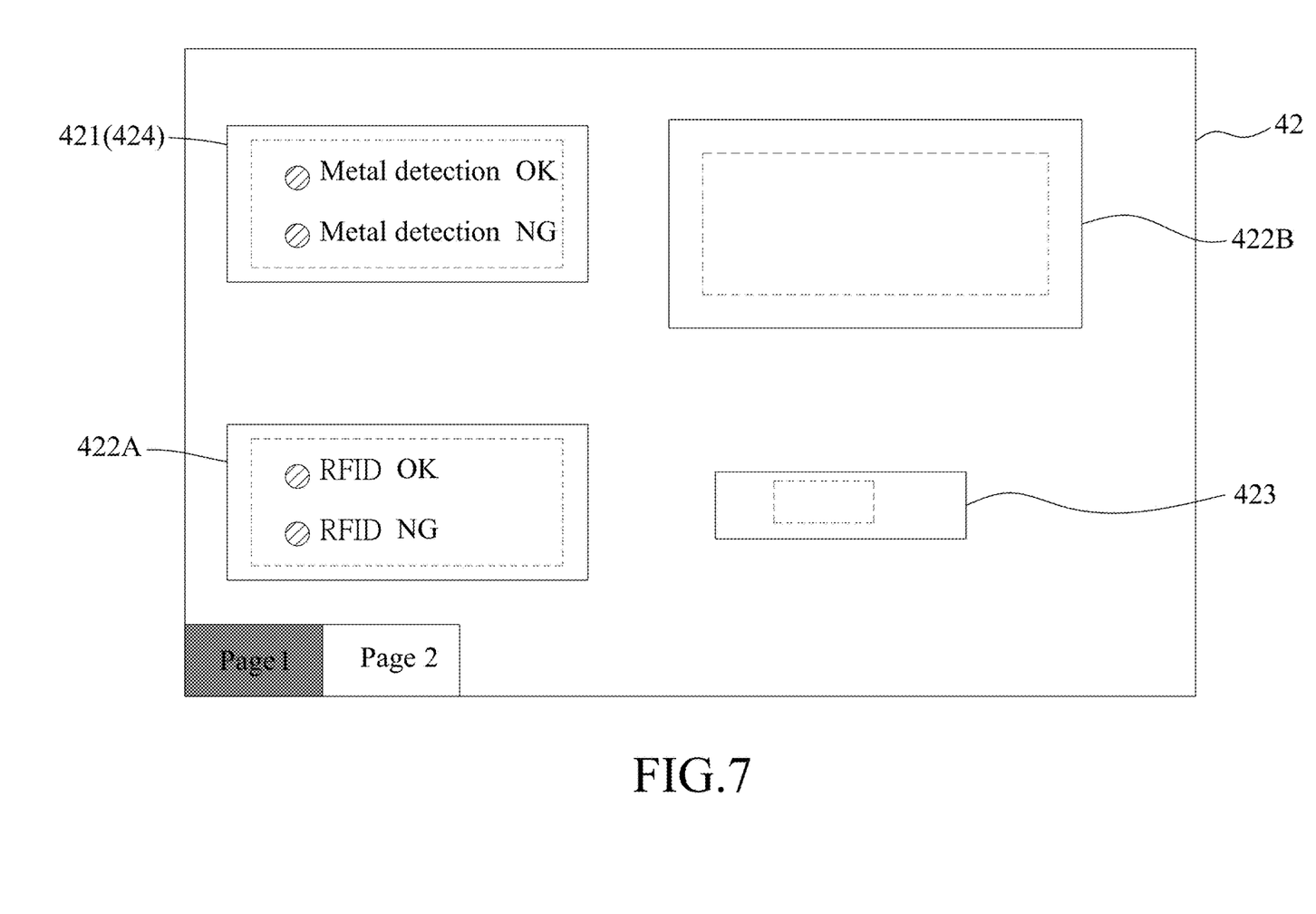
FIGS. 7 and 8 illustrate two pages displayed by a second display of the display unit, respectively.
Figure 8:
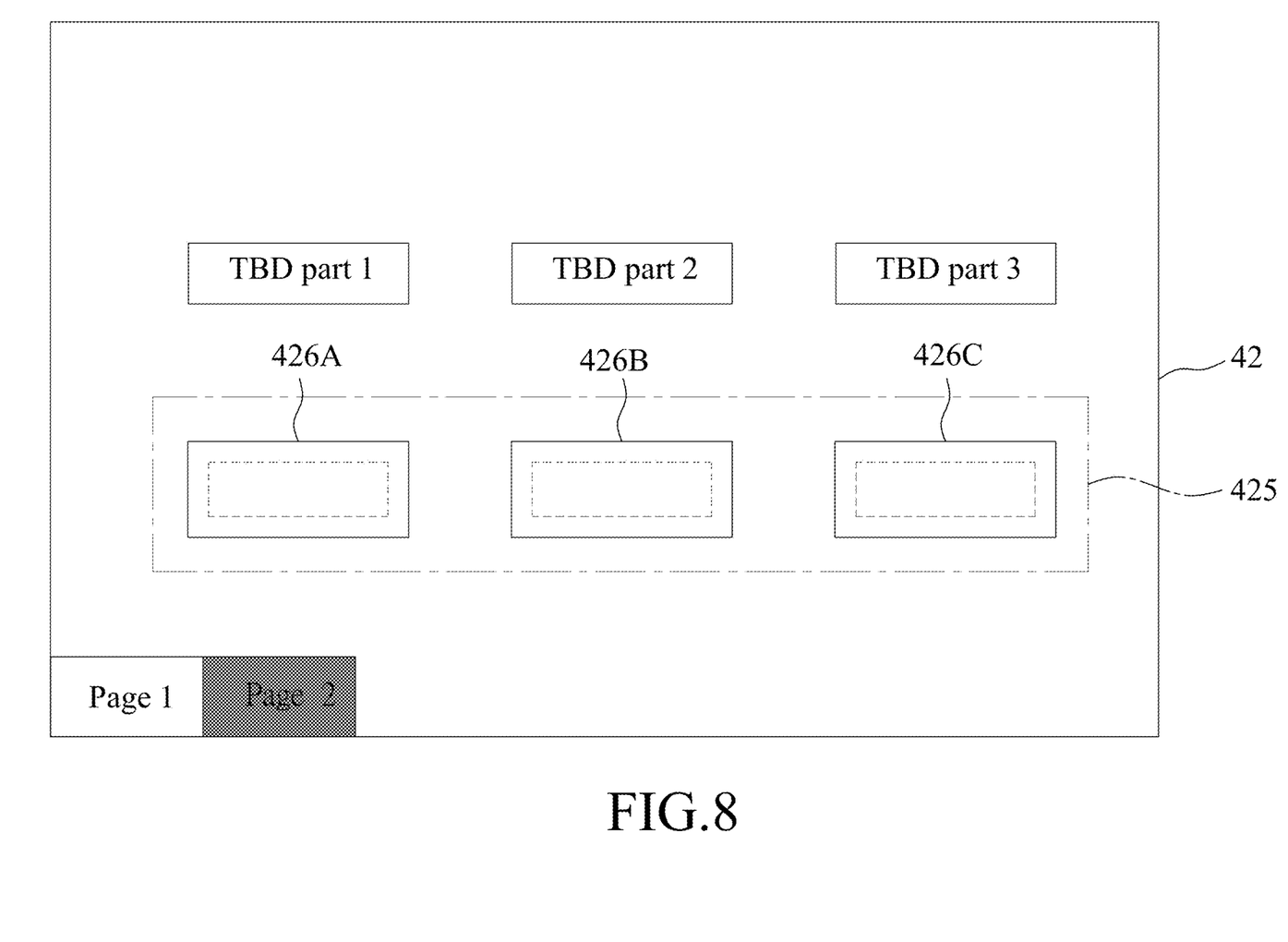

The display unit 4 includes a first display 41 and a second display 42, and is disposed to cover the opening 121 of the covering shell 12. In this embodiment, each of the first and second displays 41 and 42 may be embodied using a touch screen, the first display 41 may have a screen with a layout as shown in FIG. 6. The second display 42 may display a first page (as shown in FIG. 7) and a second page (as shown in FIG. 8) that contains different information and that can be switched by, for example, touching a specific part of the second display 42. It is noted that in other embodiments, the second display 42 may be configured to display only one page with all the intended information being contained therein, or may be configured to display more than two pages for displaying more information.

The processor unit 5 includes a processor 50 and a database 51. The processor 50 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

In this embodiment, the processor 50 is electrically connected to the magnetic sensor 21 and the counting module 22 of the detecting unit 2 and the tag reader 3, and is configured to receive the magnetic signal, the passage signal and the tag signal therefrom, respectively. The processor 50 is further electrically connected to the display unit 4 (specifically, the first and second displays 41, 42) to control the display unit 4 to display information regarding the magnetic signal and the tag signal on the first and second displays 41 and 42, respectively.

The database 51 may be embodied using one or more of a hard disk, a solid-state drive (SSD) and other non-transitory storage medium. The database 51 stores information regarding the magnetic fields created in response to various materials traveling past the magnetic sensor 21.

In use, after the detecting machine is activated, the processor 50 may control the actuator 15 to drive the rolling members 142 so as to move the conveyor belt 141 such that when the TBD object 6 is placed on the conveyor belt 141 in proximity to the initial end 111, the conveyor belt 141 is configured to move the TBD object 6 toward the destination end 112.

As the TBD object 6 is moved past the overhead arch 16, the magnetic sensor 21 is configured to generate the magnetic signal. In response, the processor 50 is capable of determining whether the TBD object 6 contains a metal foreign object made of one or more specific electrically conductive metal materials (e.g., iron, stainless steel, aluminum, zinc, copper, etc.) based on the magnetic signal and the information stored in the database 51. In this embodiment, the determination may be associated with magnetic metal materials (e.g., iron, stainless steel, etc.)

In cases that the TBD parts 61A, 61B, 61C are placed on the conveyor belt 141 separately, the magnetic signal includes three partial magnetic signals associated with the detection of the TBD parts 61A, 61B, 61C, respectively.

When the processor 50 determines that the magnetic sensor 21 detects one of the specific metal materials stored in the database 51, the magnetic signal thus generated may indicate that the TBD object 6 as a whole contains the specific metal material.

On the other hand, when the processor 50 determines that the magnetic sensor 21 does not detect any of the specific metal materials, the magnetic signal thus generated by indicate that the TBD object 6 is free of the specific metal materials.

As a result, the processor 50 may control the second display 42 to display the information in a first general field of the first page. As shown in FIG. 7, the first general field 421 may include two circles that can be controlled to be "turned on" (e.g., displayed in a specific color such as green) or "turned off" (e.g., displayed in a specific color such as black). The two circles indicate that the TBD object 6 does not contain any of the specific metal materials (i.e., result of the metal detection of the TBD object 6 is "O.K."), and that the TBD object 6 contains at least one of the specific metal materials (i.e., result of the metal detection of the TBD object 6 is "N.G."), respectively.

Additionally, for each of the TBD parts 61A, 61B and 61C, the processor 50 may control the second display 42 to display the information in three separate partial fields 426A, 426B and 426C of the second page (see FIG. 8). Each of the partial fields 426A, 426B and 426C may include the corresponding specific metal material that is detected by the magnetic sensor 21.

Simultaneously, the tag reader 3 that is disposed beside the overhead arch 16 is configured to detect the tag 62 on the TBD object 6 in response to the TBD object 6 moving past the overhead arch 16, and to generate the tag signal.

The tag signal may indicate whether the tag reader 3 has detected a tag on the TBD object 6. The tag 62 may include tag information regarding the TBD object 6. In this embodiment, the tag information may include a model number, a size, a color of the pair of shoes in the shoebox. When the tag reader 3 has detected the tag 62 on the TBD object 6, the tag signal may include the information obtained from the tag 62. When the tag reader 3 does not detect a tag on the TBD object 6 (which may result from the tag 62 being missing or damaged), the tag signal may include an alert message. In response to receipt of the tag signal including the alert message, the processor 50 may determine that the TBD object 6 does not have an intact tag.

As a result, the processor 50 may control, based on the tag signal, the second display 42 to display the information from the tag signal in a second general field 422A of the first page. As shown in FIG. 7, the second general field 422A may include two circles that can be controlled to be "turned on" (e.g., displayed in a specific color such as green) or "turned off" (e.g., displayed in a specific color such as black). The two circles indicate that the TBD object 6 includes a tag that is intact (i.e., an RFID detection of the TBD object 6 is "O.K."), and that the TBD object 6 does not include a tag or includes a tag that is damaged (i.e., the RFID detection of the TBD object 6 is "N.G."), respectively. The reason for an "N.G." detection may include that the tag is damaged or missing, and therefore cannot be detected by the tag reader 3.

In some embodiments, the processor 50 may control the second display 42 to display the information from the tag signal (such as the tag information obtained from the tag 62 or the alert message) in a second specific field 422B of the first page, and to display information regarding a number of objects that have passed the destination end 112 in a counter field 423 of the first page (see FIG. 7). Specifically, in this embodiment, the information displayed in the counter field 423 includes the number of objects that have passed the destination end 112 and that are determined to be "a good part" (i.e., does not contain any of the specific magnetic metal materials and the tag of which is intact).

In this embodiment, in response to the magnetic signal indicating that the TBD object 6 contains a metal foreign object made of one of the specific magnetic metal materials, the processor 50 controls the actuator 15 to actuate the rolling members 142 to drive the conveyor belt 141 to move the TBD object 6 thereon back toward the initial end 111. In this case, the determination that the TBD object 6 contains one of the specific magnetic metal materials may indicate that the TBD object 6 is defective and requires human inspection.

On the other hand, when the magnetic signal indicates that the TBD object 6 does not contain any of the specific magnetic metal materials, the processor 50 controls the actuator 15 to actuate the rolling members 142 to drive the conveyor belt 141 to move the TBD object 6 thereon toward the destination end 112. In such a case, when the TBD object 6 is moved past the counting module 22, the counting module 22 generates the passage signal upon detection of an object passing the destination end 112, and the processor 50 is configured to determine the number of objects having passed the destination end 112 based on the passage signal, and to control the display unit 4 to display information regarding the number of objects having passed the destination end 112. For example, every time when the processor 50 receives the passage signal, the processor 50 adds one to the number of objects having passed the destination end 112.

In this embodiment, a relationship among the components collecting data, the resulting signals and the subsequent uses of the signals are illustrated in FIG. 5.

That is, the magnetic signal generated by the magnetic sensor 21 is transmitted to the processor 50, and then the information associated with the magnetic signal may be displayed by both the first display 41 and the second display 42. The passage signal generated by the counting module 22 is transmitted to the processor 50, and then the information associated with the passage signal may be displayed by the second display 42. The tag signal generated by the tag reader 3 is transmitted to the processor 50, and then the information associated with the tag signal may be displayed by the second display 42. Furthermore, the processor 50 is configured to control the actuator 15 based on the received signals.

The specific information that may be displayed in the display unit 4 is depicted in the following Table 1.

TABLE 1

| Associated Signal | Description of the information | Example |
|---|---|---|
| Magnetic signal | Whether the TBD object contains any of the specific magnetic metal materials (The "Metal detection O.K." information or the "Metal detection N.G." information) | As illustrated in the first general field 421 of the first page on the second display 42. |
| | The kind of magnetic metal material detected | As shown in FIG. 6, the first display 41 may display a number of columns each representing one specific magnetic metal material. Moreover, for each detection of a specific magnetic material, the processor 50 may add one to an accumulated number of objects with the corresponding specific magnetic metal material. In addition, a total accumulated number of objects detected to have a magnetic metal material represents the number of all objects detected to have any of the specific magnetic metal materials. The first display 41 may further include information such as a notification of signal detection, a sensitivity, etc. |
| Partial magnetic signal | Whether a corresponding one of the TBD parts contains one of the specific magnetic metal material | When it is determined that the corresponding one of the TBD parts contains one of the specific magnetic metal materials, the specific magnetic metal material may be displayed in a corresponding one of the partial fields 426A, 426B and 426C of the second page on the second display 42. |
| Passage signal | Information regarding number of objects having passed the destination end 112 | This number may be used to calculate equipment performance such as a first pass yield (FPY). Specifically, only the objects that are determined to be good parts are counted. |
| Tag signal | The "RFID O.K." information | Displayed in the second general field 422A of the first page of the second display 42 when it is determined that the TBD object 6 includes a tag that is intact. |
| | The "RFID N.G." information | Displayed in the second general field 422A of the first page on the second display 42 when it is determined that the TBD object 6 does not include a tag that is intact. Moreover, for each N.G. detection, the processor 50 may add one to an accumulated number of objects with the N.G. tag detection. |
| | Tag information | Displayed in the second specific field 422B of the first page on the second |

TABLE 1-continued

| Associated Signal | Description of the information | Example |
|---|---|---|
| | | display 42, and may include a model number, a size, and/or a color of the pair of shoes. |

In use, as the TBD object 6 moves past and under the overhead arch 16, one of the following three cases may happen:

a) When it is determined by the processor 50 that the TBD object 6 contains none of the specific magnetic metal materials and includes a tag 62 that is intact based on the magnetic signal and the tag signal, the TBD object 6 is then moved to the destination end 112, at which the counting module 22 generates the passage signal. The processor 50 controls the display unit 4 to display the "Metal detection O.K." information in the first general field 421 on the first page of the second display 42, to display the "RFID O.K." information in the second general field 422A on the first page of the second display 42, to display the tag information obtained from the tag 62 in the second specific field 422B of the first page, and to display the number of objects having passed the destination end 112 in the counter field 423 of the first page.

b) When it is determined by the processor 50 that the TBD object 6 contains none of the specific magnetic metal materials but does not include an intact tag, the TBD object 6 is then moved to the destination end 112, at which the counting module 22 generates the passage signal. The processor 50 controls the display unit 4 to display the "Metal detection O.K." information in the first general field 421 on the first page of the second display 42, and to display the "RFID N.G." information in the second general field 422A on the first page of the second display 42.

c) Regardless of whether an intact tag is detected, when it is determined by the processor 50 that the TBD object 6 contains one of the specific magnetic metal materials based on the magnetic signal, the TBD object 6 is then moved back to the initial end 111. The processor 50 controls the display unit 4 to display the "Metal detection N.G." information in the first general field 421 on the first page of the second display 42, to display an accumulated number of objects with the corresponding specific magnetic metal material (which may be incremented by 1) in a corresponding number field (412 or 413) of the first display 41, and to display a total accumulated number of objects detected to have a specific magnetic metal material (which may be incremented by 1) representing the number of all objects detected to have any one of the specific magnetic metal materials in a total number field 411 of the first display 41.

In this embodiment, after the TBD object 6 is moved back to the initial end 111, relevant personnel may perform a detailed inspection by removing the pair of shoes (i.e., the TBD parts 61B, 61C) from the shoebox (i.e., the TBD part 61A), place one of the TBD parts on the conveyor belt 141, and operate the detecting machine (e.g., by clicking a start button on the first display 41) such that the processor 50 controls the actuator 15 to actuate the transporting module 14 to move the one of the TBD parts past the overhead arch 16 for determining whether the one of the TBD parts contains one of the specific magnetic metal materials. Then, the personnel may operate the detecting machine such that the processor 50 controls the actuator 15 to actuate the transporting module 14 to move the one of the TBD parts back to the initial end 111. The above procedure may be repeated for each of the TBD parts to find which one(s) of the TBD parts contains one of the specific magnetic metal materials. The information in the three separate partial fields 426A, 426B and 426C of the second page of the second display 42 may include accumulated numbers of the TBD parts 61A to 61C that is detected to contain a specific magnetic metal material, respectively.

It is noted that in this embodiment, in counting the number of good parts passing the destination end 112, the processor 50 is configured to disregard any object that passes the destination end 112 but that is not associated with information indicating "Metal detection O.K." and "RFID O.K.". That is to say, when the TBD object 6 with a damaged tag passes the destination end 112 (no passage signal is received), the processor 50 is configured to determine that the TBD object 6 is not a good part, and therefore is configured to not increment the number of good parts to be displayed on the counter field 423.

It is noted that in some embodiments, the tag reader 3 may initially be deactivated, and is activated only when it is determined by the processor 50 that the TBD object 6 does not contain any of the specific magnetic metal materials. That is to say, in the case that it is determined by the processor 50 that the TBD object 6 contains one of the specific magnetic metal materials, the tag reader 3 remains deactivated, and no tag signal is generated. The absence of a tag signal may eliminate the potential situation that an object containing a specific magnetic metal material accidentally passes the destination end 112 and is counted as a good part.

Additionally, other unrelated objects (e.g., hands of the personnel) passing the destination end 112 are similarly not counted as a good part.

To sum up, the embodiments of the disclosure provide a detecting machine for detecting a TBD object 6 so as to determine whether the TBD object 6 contains a metal foreign object made of a specific magnetic metal material. By incorporating the display unit 4 which is configured to display information regarding the magnetic signal and the tag signal, the personnel is enabled to view various information associated with the TBD object 6 on the display unit 4 (as depicted in FIGS. 6 to 8). Moreover, by displaying the information associated with the TBD parts, the personnel may be made aware about which one(s) of the TBD parts is(are) more likely to be defective, and may determine whether the manufacturing process of the one(s) of the TBD parts may need to be adjusted.

Additionally, by displaying the number of objects that are considered good parts and the number of objects that are considered defective, the personnel may be aware of performance of the equipment for manufacturing the TBD objects such as a first pass yield (FPY).

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A detecting machine for detecting a metal foreign object in a to-be-detected (TBD) object that includes a tag, said detecting machine comprising:
   a base unit that includes a transporting module and an overhead arch disposed over said transporting module, said transporting module being configured to move the TBD object past said overhead arch;
   a detecting unit that is disposed on said base unit and that includes a magnetic sensor capable of generating a magnetic signal in response to the TBD object moving past said overhead arch;
   a tag reader that is disposed on said base unit beside said overhead arch and that is capable of detecting the tag on the TBD object in response to the TBD object moving past said overhead arch, and generating a tag signal based on a result of the detecting action;
   a display unit that is disposed on said base unit and that includes a first display and a second display; and
   a processor that is connected to said detecting unit and said tag reader, that is configured to receive the magnetic signal and the tag signal therefrom, respectively, and that is connected to said display unit and configured to control said display unit to display information regarding the magnetic signal and the tag signal on said first and second displays;
   wherein said base unit further includes a base that has an initial end and a destination end, and said transporting module includes a conveyor belt that is disposed on said base and that is configured to move the TBD object thereon toward one of said initial end and said destination end;
   wherein said detecting unit further includes a counting module that is connected to said processor and that is configured to generate a passage signal upon detection of an object passing said destination end, and said processor is configured to determine a number of objects having passed said destination end and to control said display unit to display information regarding the number of objects having passed said destination end.

2. The detecting machine of claim 1, wherein:
   said base unit further includes an actuator connected to said processor, and said transporting module further includes two rolling members;
   said actuator is controlled by said processor to actuate said rolling members to rotate;
   said conveyor belt is configured to be moved by said rolling members to move the TBD object thereon from one of said initial end and said destination end to the other one of said initial end and said destination end; and
   in response to a magnetic signal indicating that the TBD object contains a magnetic metal material, said processor controls said actuator to actuate said rolling members to rotate so as to move said conveyor belt to move the TBD object thereon toward said initial end.

3. The detecting machine of claim 1, wherein said second display has a counter field, and said processor is configured to control said second display to display in said counter field the information regarding the number of objects which have passed said destination end, which are determined to not contain a magnetic metal material and each of which has an intact tag.

4. The detecting machine of claim 1, wherein said processor is configured to determine whether the TBD object contains a magnetic metal material based on the magnetic signal and whether the tag of the TBD object is intact based on the tag signal, and to increment a number of objects that have passed said destination end in response to the determination that the TBD object does not contain the magnetic metal material and that the tag of the TBD object is intact.

5. The detecting machine of claim 1, wherein said base unit further includes a covering shell that covers said overhead arch and that is formed with an opening, and said display unit is disposed to cover said opening.

6. A detecting machine for detecting a metal foreign object in a to-be-detected (TBD) object that includes a tag, said detecting machine comprising:
   a base unit that includes a transporting module and an overhead arch disposed over said transporting module, said transporting module being configured to move the TBD object past said overhead arch;
   a detecting unit that is disposed on said base unit and that includes a magnetic sensor capable of generating a magnetic signal in response to the TBD object moving past said overhead arch;
   a tag reader that is disposed on said base unit beside said overhead arch and that is capable of detecting the tag on the TBD object in response to the TBD object moving past said overhead arch, and generating a tag signal based on a result of the detecting action;
   a display unit that is disposed on said base unit and that includes a first display and a second display; and
   a processor that is connected to said detecting unit and said tag reader, that is configured to receive the magnetic signal and the tag signal therefrom, respectively, and that is connected to said display unit and configured to control said display unit to display information regarding the magnetic signal and the tag signal on said first and second displays;
   the TBD object further including a TBD part, wherein:
   the magnetic signal generated by said at least one magnetic sensor includes a partial magnetic signal in response to the TBD part moving past said overhead arch;
   said second display includes a partial field; and
   said processor is further configured to control said second display to display information regarding the partial magnetic signal in the partial field.

7. The detecting machine of claim 6, wherein:
   said base unit further includes a base that has an initial end and a destination end, and said transporting module includes a conveyor belt that is disposed on said base and that is configured to move the TBD object thereon toward one of said initial end and said destination end;
   said detecting unit further includes a counting module disposed in proximity of said destination end and connected to said processor, said counting module is configured to generate a passage signal upon detection of an object passing said destination end, and said processor is configured to determine a number of objects that have passed said destination end based on the passage signal and to control said display unit to display information regarding the number of objects that have passed said destination end.

8. The detecting machine of claim 7, wherein said second display further includes a counter field, and said processor is configured to control said second display to display in said counter field the information regarding the number of objects which have passed said destination end, which are determined to not contain the magnetic metal material and each of which has an intact tag.

9. The detecting machine of claim 7, wherein said processor is configured to increment a number of objects that have passed said destination end in response to the determination that the TBD object does not contain the magnetic metal material and that the tag of the TBD object is intact.

10. The detecting machine of claim 1, wherein the tag signal includes either tag information included in the tag or an alert message in the case said tag reader cannot detect a tag, and said second display includes a field for displaying the tag information or the alert message.

11. The detecting machine of claim 1, wherein said processor unit further includes a database that stores information regarding the magnetic fields created in response to a plurality of specific magnetic metal materials traveling past said detecting unit, so as to enable said processor to determine whether the TBD object contains the magnetic metal material, which is one of the specific magnetic metal materials.

\* \* \* \* \*